(12) United States Patent
Boamfa et al.

(10) Patent No.: US 11,002,667 B2
(45) Date of Patent: *May 11, 2021

(54) CALIBRATION SLIDE FOR DIGITAL PATHOLOGY

(71) Applicant: KONINKLIJKE PHILIPS N.V., Eindhoven (NL)

(72) Inventors: Marius Iosif Boamfa, Veldhoven (NL); Susanne Maaike Valster, Valkenswaard (NL); Prarthana Shrestha, Best (NL)

(73) Assignee: KONINKLIJKE PHILIPS N.V., Eindhvoen (NL)

( * ) Notice: Subject to any disclaimer, the term of this patent is extended or adjusted under 35 U.S.C. 154(b) by 322 days.

This patent is subject to a terminal disclaimer.

(21) Appl. No.: 16/063,724

(22) PCT Filed: Dec. 23, 2016

(86) PCT No.: PCT/EP2016/082564
§ 371 (c)(1),
(2) Date: Jun. 19, 2018

(87) PCT Pub. No.: WO2017/109175
PCT Pub. Date: Jun. 29, 2017

(65) Prior Publication Data
US 2020/0264096 A1 Aug. 20, 2020

(30) Foreign Application Priority Data
Dec. 23, 2015 (EP) ..................... 15202506

(51) Int. Cl.
*G02B 21/34* (2006.01)
*G01N 21/27* (2006.01)
(Continued)

(52) U.S. Cl.
CPC ....... *G01N 21/278* (2013.01); *G01N 21/6458* (2013.01); *G02B 5/008* (2013.01);
(Continued)

(58) Field of Classification Search
CPC .. G01N 21/278; G01N 21/6458; G02B 21/34; G02B 5/008; G02B 21/0076; G02B 21/008
See application file for complete search history.

(56) References Cited

U.S. PATENT DOCUMENTS 5,694,212 A * 12/1997 Weissman ............. G02B 21/26
356/237.1
6,424,421 B1 7/2002 Cremer et al.
(Continued)

FOREIGN PATENT DOCUMENTS

WO 2013039454 A1 3/2013

OTHER PUBLICATIONS

Lee "Bright-Field and Fluorescence Chip-Scale Microscopy for Biological Imaging", California Institute of Teachnology, Pasedena, California, 2014, p. 1-117. (Year: 2014).*
(Continued)

*Primary Examiner* — David P Porta
*Assistant Examiner* — Mamadou Faye
(74) *Attorney, Agent, or Firm* — Austin Sherry

(57) ABSTRACT

The present invention relates to digital pathology. In order to improve uniformity at microscopic level and to enhance stability in time for color calibration, a calibration slide (10) is provided for a digital pathology scanning microscope. The calibration slide comprises a substrate (12) and a pixel layout (14) comprising a plurality of spaced apart metal nanostructures (16) arranged on a surface (18) of the substrate. The substrate is optically transparent. The metal nanostructures are arranged to produce plasmon resonances
(Continued)

for generating a color image under a bright-field illumination. The color image comprises a plurality of calibration color values that are provided for calibrating a digital pathology imaging system.

15 Claims, 8 Drawing Sheets

(51) Int. Cl.
G01N 21/64 (2006.01)
G02B 5/00 (2006.01)
G02B 21/00 (2006.01)

(52) U.S. Cl.
CPC ....... *G02B 21/008* (2013.01); *G02B 21/0076* (2013.01); *G02B 21/34* (2013.01)

(56) References Cited

U.S. PATENT DOCUMENTS

| | | | |
|---|---|---|---|
| 6,905,838 | B1 | 6/2005 | Bittner |
| 2004/0009098 | A1 | 1/2004 | Torre-Bueno |
| 2004/0196455 | A1 | 10/2004 | Ermantraut |
| 2008/0309929 | A1 | 12/2008 | Christiansen |
| 2009/0195866 | A1 | 8/2009 | Kawaski |
| 2009/0279787 | A1 | 11/2009 | Kishii |
| 2009/0325816 | A1 | 12/2009 | Mirkin |
| 2011/0318226 | A1 | 12/2011 | Yu |
| 2013/0029559 | A1 | 1/2013 | Tremblay |
| 2013/0109050 | A1 | 5/2013 | Purvis |
| 2014/0095100 | A1* | 4/2014 | Raphael ................ B82Y 15/00 702/104 |
| 2015/0103401 | A1* | 4/2015 | Park ....................... G02B 21/34 359/363 |
| 2015/0124306 | A1 | 5/2015 | Bartoli |
| 2015/0138632 | A1 | 5/2015 | Mikhailov |
| 2016/0048010 | A1 | 2/2016 | Nowatzyk |
| 2016/0327486 | A1 | 11/2016 | Di Fabrizio |
| 2018/0023124 | A1* | 1/2018 | Collins ................ C12O 1/6827 435/6.11 |

OTHER PUBLICATIONS

Shrestha, P. et al., "Color accuracy and reproducibility in whole slide imaging scanners", Journal of Medical Imaging 1(2), 027501 (Jul.-Sep. 2014).
Murakami, Y. et al., "Color correction in whole slide digital pathology," Proc. 20th IS&T Color and Imaging Conference, Nov. 2012, Abstract.
Bautista, P. et al. "Color standardization in whole slide imaging using a color calibration slide", Journal of Pathology Informatics, vol. 5, No. 1, article 4, 2014.
https://en.wikipedia.org/wiki/Digital_pathology.
PCT International Search Report, International application No. PCT/EP2016//082564, dated Dec. 23, 2016.
PCT International Search Report, International Application No. PCT/EP2016/082352, dated Jun. 29, 2017.
Kim, S. et al. "Patterned Arrays of Au Rings for Localized Surface Plasmon Resonance", Langmuir, vol. 22, No. 17, Aug. 2006, pp. 7109-7112.
Barnes, W. et al "Surface Plasmon Subwavelength Optics", Nature, vol. 424, No. 6950, Aug. 2003, pp. 824-830.

* cited by examiner

CALIBRATION SLIDE FOR DIGITAL PATHOLOGY

CROSS-REFERENCE TO RELATED APPLICATIONS

This patent application claims the priority benefit under 35 U.S.C. § 371 of International Patent Application No. PCT/EP2016/082564 filed Dec. 23, 2016, which claims the benefit of European Patent Application No. 15202506.0, filed on Dec. 23, 2015. The International Patent Application No. PCT/EP2016/082564 is herein incorporated by reference in its entirety.

FIELD OF THE INVENTION

The present invention relates to the field of whole slide imaging in digital pathology, and in particular to a calibration slide, to a calibration system, and to a method for calibrating a digital pathology scanning microscope.

BACKGROUND OF THE INVENTION

In digital pathology, images of pathological slides are captured and stored in a digital form, which can be viewed, managed, and analyzed on a computer monitor. It is thus important that colors from the pathology slides are displayed in a constant and reliable fashion. However, the color responses between different digital pathology scanners may be different. Even for the same digital pathology scanner, the color response may vary along with time.

Hence, calibration slides have been developed to calibrate color response of digital pathology scanner in order to establish a known relationship to a standard color space. For example, in "Color accuracy and reproducibility in whole slide imaging scanners", in Medical Imaging 2014: Digital Pathology, vol. 9041 of Proceedings of SPIE, 2014, by P. Shrestha and B. Hulsken, color calibration slide has been developed based on synthetic targets such as photographic transparency of the Macbeth color target. Such film based methods involve imaging the target with imaging device and then using the resulting image to develop a color correction profile specific to that device. However, such method is limited by the fact that the colors are produced by combinations of cyan, magenta, and yellow film dyes which have substantially different spectra from those of histopathology stains.

To address these limitations, in "Color correction in whole slide digital pathology," Proc. 20th IS&T Color and Imaging conference, November, 2012, by Y. Murakami, H. Gunji, F. Kimura, A. Saito, T. Abe, M. Sakamoto, P. Bautista, and Y. Yagi, a calibration slide is described that comprises nine miniature color films, which are selected especially for hematoxylin and eosin (H&E) stains.

In order to accurately represent the target material to be imaged, in "Color standardization in whole slide imaging using a color calibration slide", Journal of Pathology Informatics, vol. 5, no. 1, article 4, 2014, by P. Bautista, N. Hashimoto, and Y. Yagi, tissue based color targets have been proposed such as a section of mouse embryo stained in a standard way.

Although efforts have been made towards improving the accuracy of color calibration by adapting colors to the target material to be imaged, a problem common to many of these methods is that at microscopic level, calibration slides may have a grain structure that may affect image quality. Even for the same calibration slide, colors, such as colors generated by stained polymer films, may not be stable, which may fade out over time.

SUMMARY OF THE INVENTION

There may be a need to provide a calibration slide with improved uniformity at microscopic level and enhanced stability in time.

The object of the present invention is solved by the subject-matter of the independent claims, wherein further embodiments are incorporated in the dependent claims. It should be noted that the following described aspects of the invention apply also for the calibration slide, for the calibration system, and for the method for calibrating a digital pathology scanning microscope.

According to a first aspect of the present invention, a calibration slide is provided for a digital pathology scanning microscope. The calibration slide comprises a substrate and a pixel layout comprising a plurality of spaced apart metal nanostructures arranged on a surface of the substrate. The substrate is optically transparent. The metal nanostructures are arranged to produce plasmon resonances for generating a color image under a bright-field illumination. The color image comprises a plurality of calibration color values that are provided for calibrating a digital pathology scanning microscope.

In this way, pixels are created to support individual colors, which may also be miniaturized and juxtaposed at an optical diffraction limit. Further, this can produce vivid colors when observed in a bright field optical microscope at a high numerical aperture (NA). Since the plasmon resonance features are below an optical resolution limit, the calibration slide is uniform at microscopic level. Further, the generated colors are stable in time, thus enabling the assessment of the stability of the digital pathology scanning microscope in time.

It should be noted that the term scanning microscope in the meaning of the invention refers to any type of microscopes that is suitable for so-called Whole Slide Imaging in Digital Pathology. For instance, the invention encompasses line based scanning as well as tile based scanning microscopes.

According to an example, the metal nanostructures are arranged to couple to each other to tune a resonance wavelength such that the plurality of calibration color values of the generated color image is adaptable to target colors of a selected color calibration method.

By making a combination of localized and coupled resonances, it is possible to design a calibration slide with resonance wavelength ranging from UV to red.

According to an example, the calibration slide is further provided with at least one layout selected from the group comprising a monolayer of colored microbeads and a resolution and distortion test target.

In other words, the calibration slide comprises two or more different samples or targets. In an example, the calibration slide comprises a color target with colors from plasmonic effects and a monolayer of colored micro-beads. In a further example, the calibration comprises a color target with colors from plasmonic effects, a monolayer of colored micro-beads, and a resolution and distortion test target.

In this way, color and phantom features can be mimicked with plasmonic resonances. Focus and imaging can be assessed with microbeads. A resolution and distortion target assesses resolution and stitching artifacts. With the combination of multiple targets on the same calibration slide, a more efficient and accurate calibration may be achieved.

According to a second aspect of the present invention, a calibration system is provided, which comprises a scanning microscope and a calibration slide according to one of the examples described above and in the following. The scanning microscope comprises a light source, a light detector, which are arranged in an optical path. In calibration, the calibration slide is arranged in the optical path. The light source is configured to provide light illuminating the calibration slide to produce plasmon resonances for generating a color image. The light detector is configured to detect light passing through the calibration slide to acquire the image data of the color image as calibration test data for calibration purposes.

The scanning microscope may be e.g. a brightfield digital pathology scanner, a brightfield and fluorescence digital pathology scanner, or a brightfield, fluorescence, and fluorescence in situ hybridization (FISH) digital pathology scanner.

According to an example, the calibration system is further provided with a calibration device comprising a storage unit and a processing unit. The storage unit is configured to store predetermined standard calibration data. The processing unit is configured to compare the acquired calibration test data and the stored predetermined standard calibration data to generate a color correction profile. The color correction profile is used for correcting color and/or resolution of pathological image data of a pathological sample obtained with the scanning microscope.

According to an example, in addition to the pixel layout, at least one layout is provided on the surface of the calibration slide, which is selected from the group comprising a monolayer of colored microbeads and a resolution and distortion test target. The light detector is configured to acquire image data of the at least one layout as further calibration test data. The storage unit is configured to store further predetermined standard calibration data of the at least one layout. The processing unit is configured to compare the acquired further calibration test data and the stored further predetermined standard calibration data for calibrating a parameter of the scanning microscope. The parameter is selected from the group comprising focus quality of the scanning microscope and resolution and stitching artifacts.

According to an example, the metal nanostructures are arranged to produce plasmon resonances that allow absorbing light at an excitation wavelength to produce photoluminescence and/or fluorescence light for generating a fluorescent image. The fluorescent image comprises a plurality of pixel intensity values that are provided for calibration of a fluorescence microscope.

In other words, the calibration slide can be used not only for calibrating colors, but also for calibrating fluorescence response e.g. for a bright-field and fluorescence imaging system. Since there is no need to change the calibration slide for calibrating colors and fluorescence response, efficiency of calibration process may be improved.

According to a third aspect of the present invention, a method is provided for calibrating a scanning microscope comprising a light source and a light detector, which are arranged in an optical path, the method comprising the following steps:
a) illuminating a calibration slide with light from the light source towards the light detector;
wherein the calibration slide is arranged in the optical path;

wherein the calibration slide comprises a substrate and a pixel layout comprising a plurality of spaced apart metal nanostructures arranged on a surface of the substrate, wherein the metal nanostructures are arranged to produce plasmon resonances; and
wherein the light illuminating the calibration slide produces plasmon resonances for generating a color image comprising a plurality of calibration color values for calibrating a scanning microscope;
b) detecting light passing through the calibration slide and acquiring image data of the color image as calibration test data;
c) using the calibration test data for calibration purposes of the scanning microscope.

According to an example, the method step c) further comprises the following sub-steps:
c1) providing predetermined standard calibration data;
c2) comparing the obtained calibration test data with the predetermined standard calibration data to generate a color correction profile; and
c3) correcting color and/or resolution of pathological image data of a pathological sample obtained with the scanning microscope by using the color correction profile.

According to an example, in addition to the pixel layout, at least one layout is provided on the surface of the calibration slide, which is selected from the group comprising a monolayer of colored microbeads and a resolution and distortion test target; and
wherein the method further comprises the following steps:
d) acquiring image data of the at least one layout as further calibration test data;
e) providing further predetermined standard calibration data of the at least one layout; and
f) comparing the acquired further calibration test data and the stored further predetermined standard calibration data for calibrating a parameter of the scanning microscope;
wherein the parameter is selected from the group comprising:
focus quality of the scanning microscope; and
resolution and stitching artifacts.

According to a fourth aspect of the present invention, a method is provided for manufacturing a calibration slide with a plurality of layouts comprising a pixel layout with a plurality of spaced apart metal nanostructures arranged on a surface of the substrate, a monolayer of colored microbeads, and a resolution and distortion test target, the method comprises the following steps:
aa) depositing a monolayer of colored microbeads on a substrate forming a microscope slide;
bb) depositing a pixel layout and a resolution and distortion test target on two different substrates forming two cover slips; and
cc) assembling two cover slips on the microscope slide to form a calibration slide.

In other words, the three processes can be done on separate substrates, which are assembled together after finishing these processes.

In this way, although the manufacturing methods of these three techniques (nano-imprint lithography and dry etching, chemical bonding, and optical lithography) are not compatible to each other, it is also possible to combine all three on one calibration slide.

According to an aspect of the present invention, a calibration slide is provided that makes use of plasmon resonance effects to generate colors. The colors can be generated with a thin layer of metal nanostructures, less than 1 µm, and thus suitable for color calibration for digital pathology, since the thickness of the calibration slide is compatible with a pathology slide. The calibration slide works in transmission mode, while the color information is encoded in the dimensional parameters of metal nanostructures. In other words, adjusting the dimensional parameters can tune plasmon resonance and thus determine colors of individual pixels. Further, the calibration slide is uniform at microscopic level and the generated colors are stable in time. In addition, due to the fabrication process (e.g. nano-imprint lithography and dry etching), the uniformity can be guaranteed over large batches, which is suitable for standardization purposes or for assessing scanner to scanner variability.

These and other aspects of the present invention will become apparent from and be elucidated with reference to the embodiments described hereinafter.

BRIEF DESCRIPTION OF THE DRAWINGS

Exemplary embodiments of the invention will be described in the following with reference to the following drawings.

The figures are only schematically illustrated and not to scale. Same reference signs refer to same or similar features throughout the figures.

DETAILED DESCRIPTION OF EMBODIMENTS

Figure 1A:
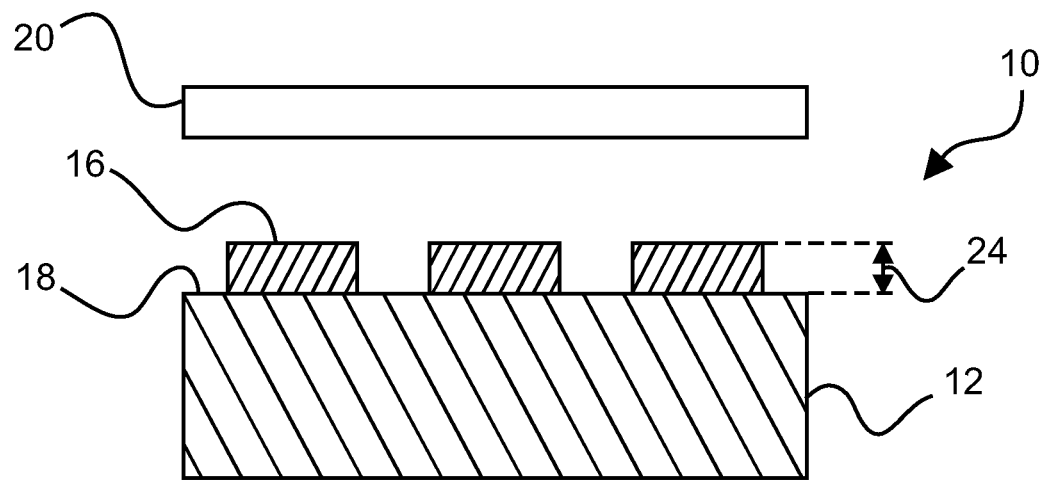
FIGS. 1A and 1B show a schematic view of an example of a calibration slide.
Figure 1B:
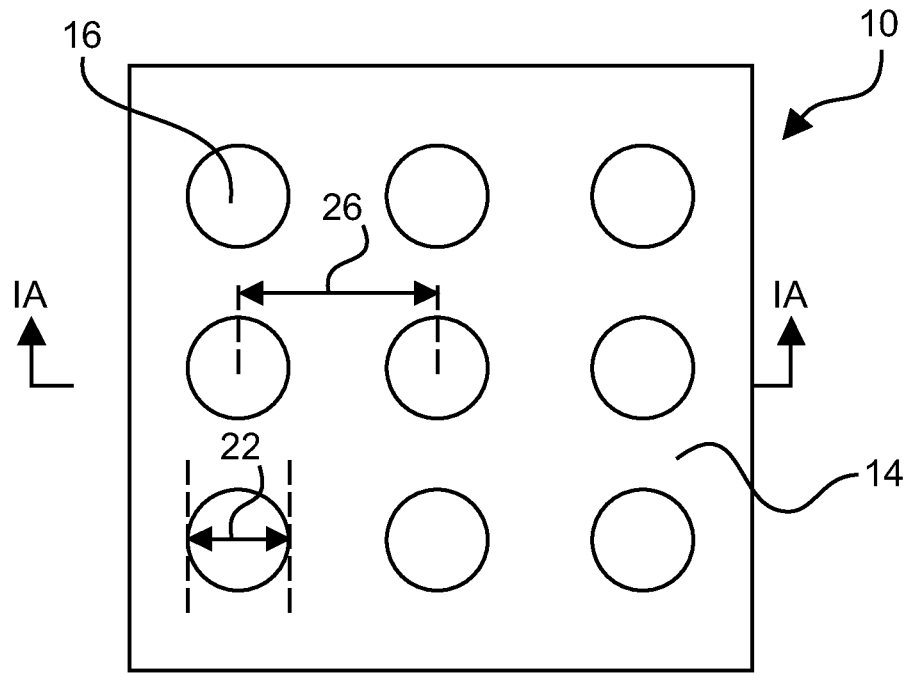
Figure 5:
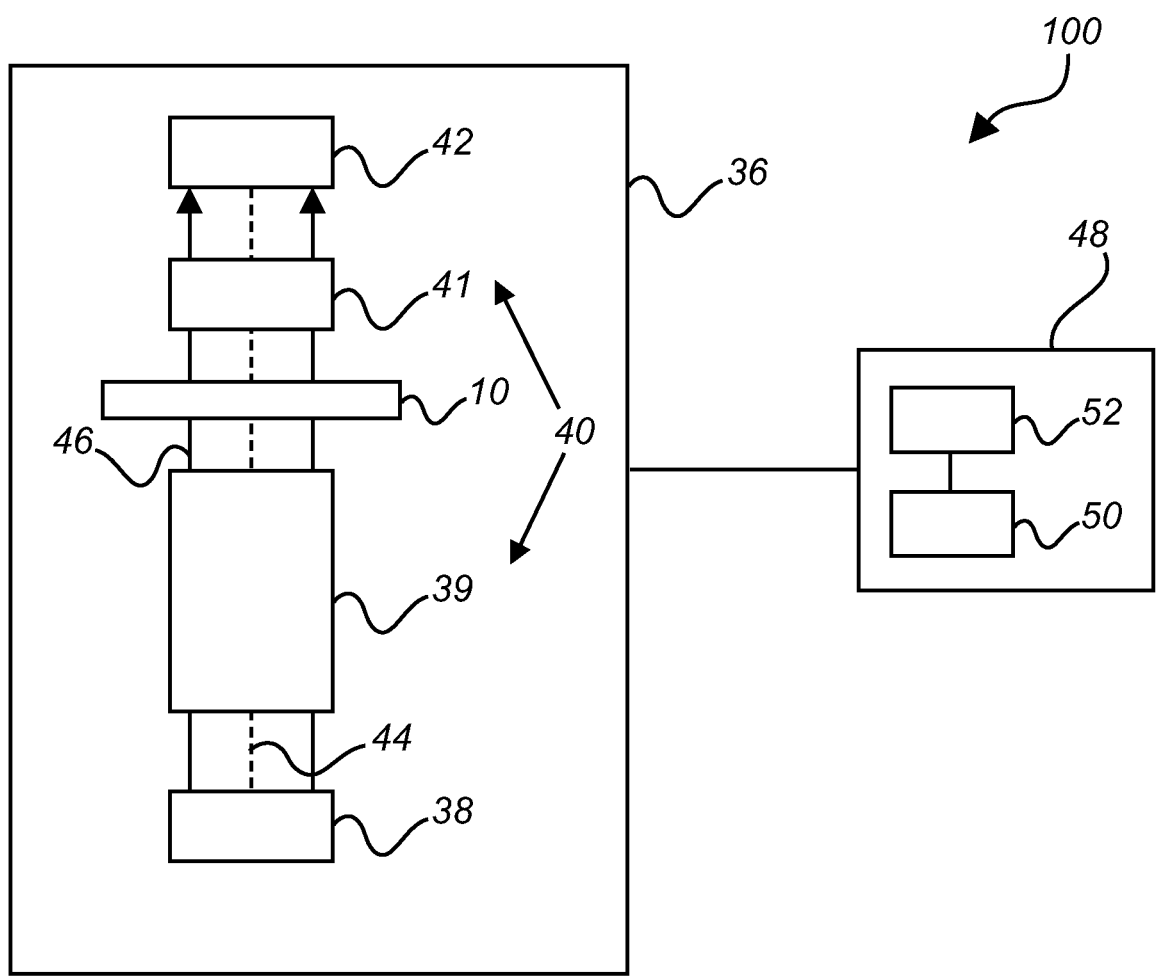
FIG. 5 shows an example of a calibration system.

FIG. 1B shows a top view of an example of a calibration slide 10 for a scanning microscope 36 (see an example in FIG. 5). FIG. 1A shows a sectional view along a line 1A-1A shown in FIG. 1B.

The calibration slide 10 comprises a substrate 12 and a pixel layout 14. The pixel layout 14 comprises a plurality of spaced apart metal nanostructures 16 arranged on a surface 18 of the substrate 12. The substrate 12 is optically transparent. The metal nanostructures 16 are arranged to produce plasmon resonances for generating a color image, e.g. an image with blue or yellow colors, under a bright-field illumination. The color image comprises a plurality of calibration color values that are provided for calibrating a scanning microscope.

Optionally, a cover slip 20 is provided for covering and protecting the pixel layout 14. For mounting the optional cover slip 20, it is possible to use glue, resin, or any other appropriate material that gets in between the metal nanostructures 16.

A further option is to cover the metal nanostructures 16 with an optically transparent oxide layer (not shown). With the oxide layer, the metal nanostructures 16 can be conformally coated. The oxide layer may be made of e.g. Silicon dioxide ($SiO_2$), Silicon nitride ($Si_3N_4$), a mixture of $SiO_2$ and $Si_3N_4$($SiO_xN_y$) or any other appropriate oxide or material. The optional oxide layer may offer a better protection and ease of the cover slip attachment. The substrate 12, also referred to as dielectric substrate, may be made of any appropriate material that is transparent at a working wavelength, which allows transmitting light without appreciable scattering or absorption. For example, the substrate may be made of silicon dioxide, titanium dioxide, silicon nitride, quarts, fused silica, plastics, sapphire, etc. The substrate 12 may be fully transparent. For example, the substrate 12 can transmit more than 90 percent of light. The substrate 12 may also be partially transparent. For example, the substrate 12 can transmit 60 percent of light. The transparency of the substrate 12 enables the calibration slide 10 to work in transmission mode, for example, under bright-light illumination.

The metal nanostructures 16 may comprise a metal selected from the group comprising gold, silver, copper, and aluminium. Other metals suitable for producing plasmon resonances may also be considered. Optionally or preferably, the metal is aluminium or aluminium alloy. Aluminium can support plasmon resonance into the ultraviolet (UV), which is not possible for silver and gold. Further, aluminium is stable in the environment and has less cost than silver and gold.

The term "nanostructure" relates to structure with at least one dimension on the nanoscale.

In an example, each metal nanostructure has a cross-sectional dimension 22 in a range of 30 nm to 700 nm, preferably 60 nm to 450 nm. The cross-section dimension 22 relates to a dimension along the surface 18 of the substrate 12, on which the metal nanostructures 16 are arranged. In FIG. 1B, the metal nanostructures 16 are illustrated to have a cross section in form of a circular shape. In this case, the cross-section dimension 22 relates to the diameter of the circular shape.

In a further example, each metal nanostructure has a thickness 24 in a range of 10 nm to 1 μm, preferably 25 nm to 150 nm. The term "thickness" relates to the height of the metal nanostructures 16 that extend from the surface 18 of the substrate 12.

As shown in FIG. 1A, the metal nanostructures 16 may form protrusions on the surface 18 of the substrate 12. In another example (not shown), the metal nanostructures 16 may form recesses on the surface 18 of the substrate 12.

The metal nanostructures 16 may be arranged periodically along the surface 18 of the substrate 12. For example, in FIG. 1B, the metal nanostructures 16 are arranged in a two-dimensional square lattice. The metal nanostructures 16 may also be arranged differently, e.g. in a two-dimensional hexagonal lattice.

In another example (not shown), the metal nanostructures 16 are arranged in a quasi periodical manner with irregular periodicity.

In an example, a distance 26 between adjacent metal nanostructures 16 is comparable to a visible light wavelength, which is in a range of 100 nm to 1 μm, preferably 180 nm to 650 nm. The distance 26 may also referred to as pitch, which is the distance between the centers of two adjacent metal nanostructures. As an option, the metal nanostructures 16 may be arranged to couple to each other to tune a resonance wavelength such that the plurality of calibration color values of the generate color image is adaptable to target colors of a selected color calibration method.

The term "calibration" relates to establishing a known relationship to a standard color space.

The term "calibration color values" relates to the color values of the color image for a selected color calibration method. Hence, calibration color values may vary according to the selected color calibration method. In an example, for Macbeth color target, the calibration color values correspond to the color values of the colors that are produced by combinations of orange, light skin, cyan, magenta, yellow, etc. In another example, tissue based color targets are used, and the calibration color values relate to the colors of a tissue such as a section of mouse embryo stained in a standard way. In a further example, the calibration color values include a representative set of colored patches of biopolymer that have been stained with the pathology stains, such as Haematoxylin, Eosin, Aniline blue, etc.

Target colors may relate to colors used in the selected color calibration method. For example, if color correction is based on Macbeth color chart, the target color relate to the colors produced by combinations of orange, light skin, cyan, magenta, yellow, etc. In another example, if tissue based color correction method is used, the target colors represent the target material to be imaged, producing color phantoms based on stained tissue. In a further example, if color calibration is based on spectra similar to those encountered when viewing pathology slides with stained tissue samples, the target colors represent colored patches of biopolymer that have been stained with the pathology stains.

The term "couple" relates to coupling plasmon resonances between adjacent metal nanostructures.

The coupling between the metal nanostructures allows tuning the resonance wavelength e.g. from UV to red.

The arrangement of the metal nanostructures 16 on the surface 18 of the substrate 18 defines the pixel layout 14.

FIG. 2A to FIG. 2D show a top view of further examples of the pixel layout 14 of the calibration slide 10.

Figure 2A:
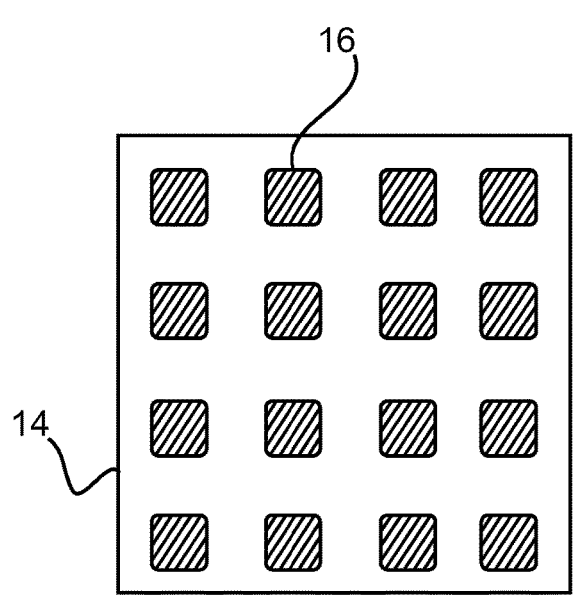
FIGS. 2A to 2D show further examples of a calibration slide.

In FIG. 2A, the pixel layout 14 comprises a lattice of single size metal nanostructures 16. Each metal nanostructure 16 defines a pixel.

Figure 2B:
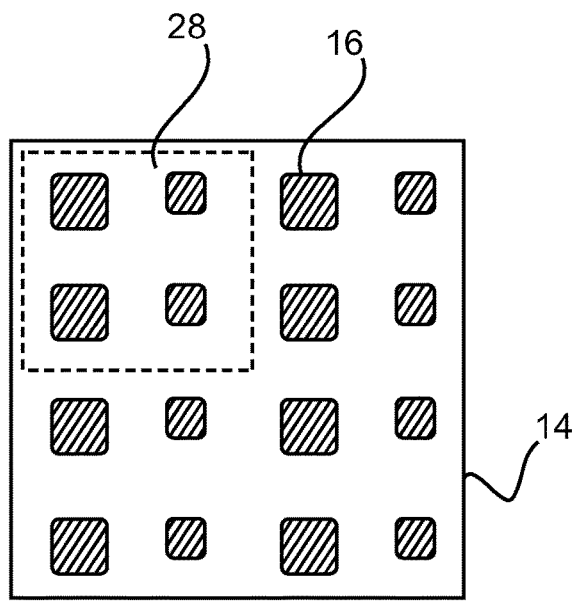
Figure 2C:
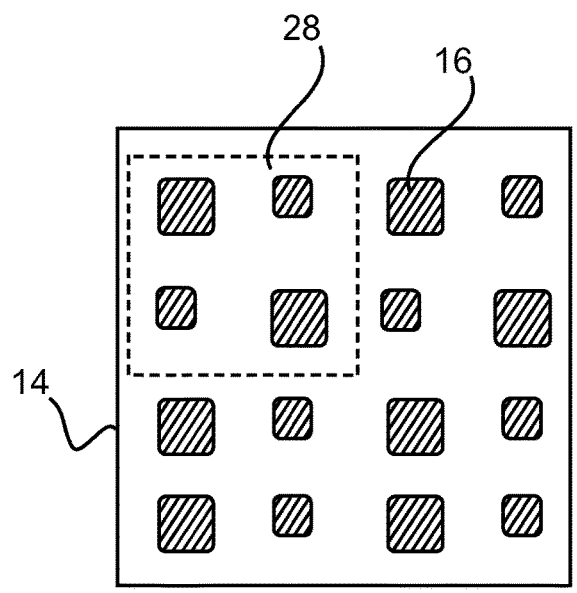
Figure 2D:
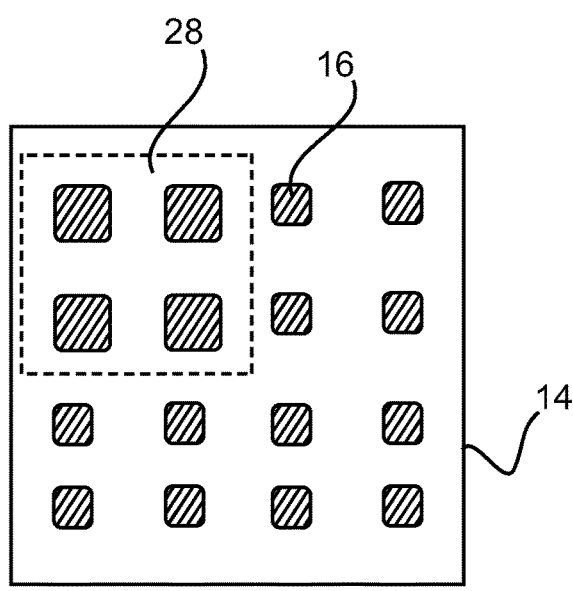

In FIGS. 2B, 2C and 2D, the colors are set by the periodicity of a plurality of metal nanostructure units 28, so each metal nanostructure unit defines a large pixel.

In FIGS. 2B and 2C, each metal nanostructure unit 28 comprises metal nanostructures 16 with different cross-sectional dimensions.

In FIG. 2D, the metal nanostructure unit 28 comprises metal nanostructures 16 with a different cross-sectional dimension from the rest of the pixel layout 14 for generating a different color.

The pixel layout 14 of the metal nanostructures 16 may be manufactured by using a method selected from the group comprising nano-imprint lithography and dry etching.

Due to the fabrication process, the uniformity can be guaranteed over large batches, which is suitable for standardization purpose.

Figure 3:
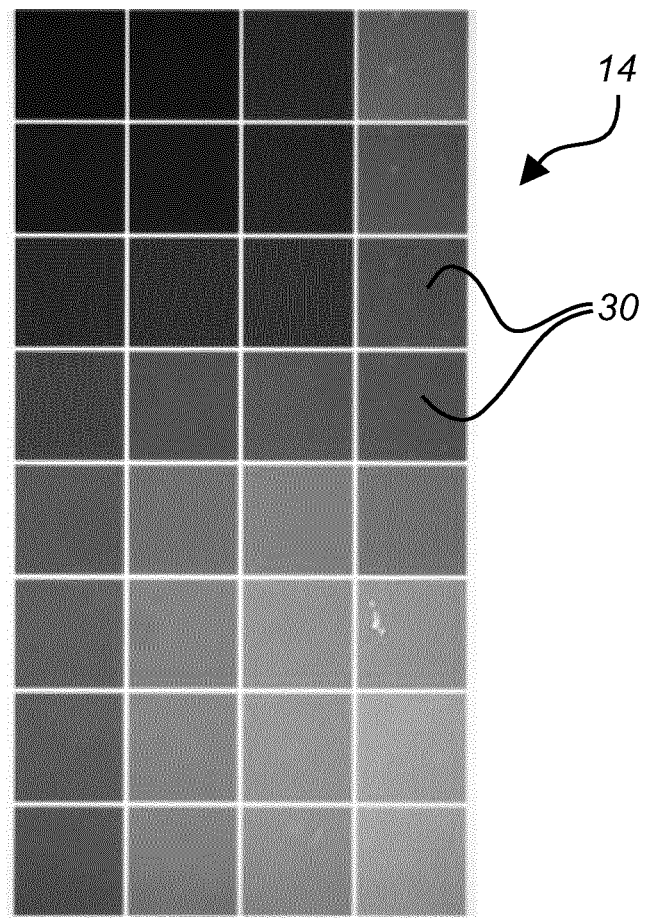
FIG. 3 shows a further example of a calibration slide.

FIG. 3 shows a further example of the pixel layout 14, which comprises at least two pixel sub-layouts 30. The at least two pixel sub-layouts 30 are configured to generate different colors, e.g. with metal nanostructures 16 with different sizes and/or different arrangement.

This may offer a flexible design of a color chart (or color target) for a selected color calibration method. For example, the pixel layout 14 may represent an IT8 color target with 24 grey fields and 264 color fields in form of pixel sub-layouts 30. The pixel layout 14 may also represent MGH (Massachusetts General Hospital) color target with 8 color fields in form of pixel-layouts 30. Thus, the pixel sub-layouts may also be referred to as color samples.

Since the plasmon resonance features are below optical resolution limit, the calibration slide is uniform at microscopic level. In addition, the calibration slide is fully compatible with a pathology slide, since the thickness of the calibration slide is similar to a pathology slide. Further, the generated colors are stable in time. This enables the assessment of the stability of the scanning microscope in time.

Figure 4:
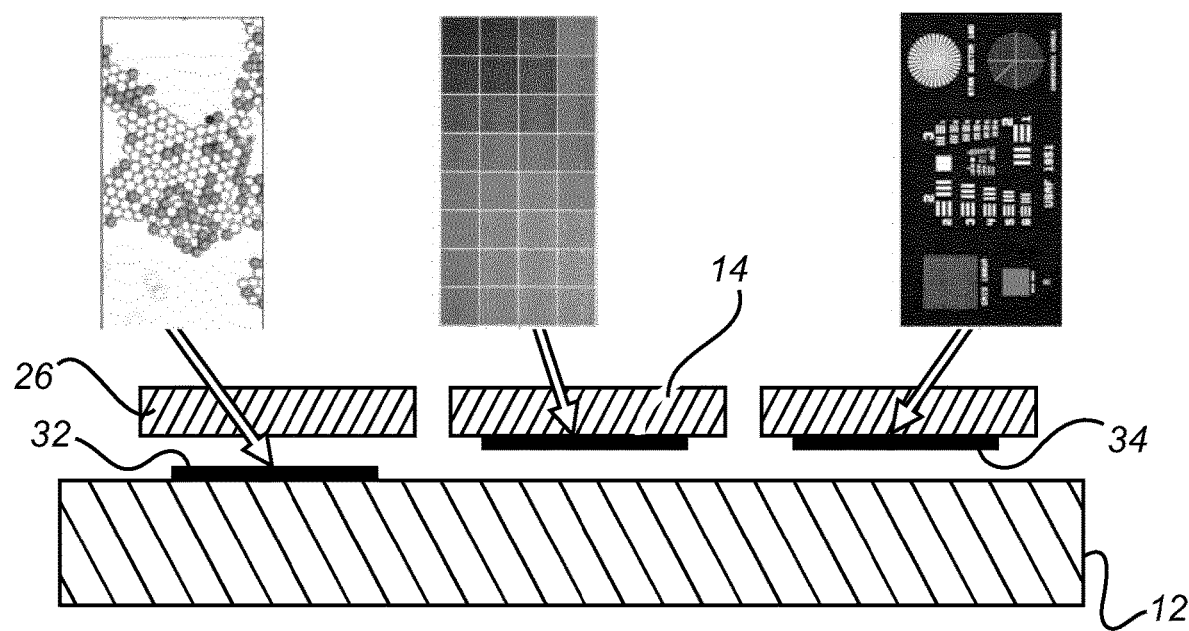
FIG. 4 shows another example of a calibration slide.

FIG. 4 shows a further example, where in addition to the pixel layout 14, at least one layout 32, 34 is provided on the surface 18 of the calibration slide 10. The at least one layout 32, 34 is selected from the group comprising a monolayer of colored microbeads and a resolution and distortion test target. As an option, both layouts 32, 34 are provided on the surface 18: the layout 32 comprises a monolayer of colored microbeads; and the layout 34 comprises a resolution and distortion test target.

In other words, the calibration slide 10 may comprise two or more different samples or targets: e.g. a color target with colors from plasmonic effects, a monolayer of colored micro-beads, and a resolution and distortion test target.

In this way, color and phantom features can be mimicked with plasmonic resonances. Focus and imaging can be assessed with microbeads. A resolution and distortion target assesses resolution and stitching artifacts. Thus, the efficiency of the calibration process may be improved. Further, this also enables a user to embed this complex sample into a scanner or a scanner stage.

The multiple layouts may be deposited on the substrate in any suitable method. In an example, shown as an option in FIG. 6, the microbeads of the layout 38 are chemically attached to the substrate 12, whereas the metal nanostructures of the pixel layout 14, and the resolution and distortion target of the layout 40 are deposited on two cover slips 26 e.g. by optical lithography process.

This may allow a combination of multiple layouts with different manufacturing methods.

FIG. 5 shows an example of a calibration system 100 in a schematic view. The calibration system 100 comprises a scanning microscope 36 and the calibration slide 10 according to an example described above.

The scanning microscope 36 comprises a light source 38, an optional optics arrangement 40, and a light detector 42, which are arranged in an optical path 44.

The optics arrangement 40 may comprise a first optics sub-arrangement 39 and a second optics sub-arrangement 41.

The first optics sub-arrangement 39 is arranged in the optical path 44 between the light source 38 and the calibration slide 10 for directing light 46 (indicated with two solid arrows) from the light source 38 to the calibration slide 10. The first optics sub-arrangement 39 may comprise e.g. condense lens, mirrors, etc. (not further shown).

The second optics sub-arrangement 41, which may comprise microscope objective and other imaging optics (not further shown), is arranged in the optical path 44 between the calibration slide 10 and the light detector 42 for directing the light 46 passing through the calibration slide 10 to the light detector 42.

In calibration, the calibration slide 10 is arranged in the optical path 44 (indicated with a dashed line). The light source 38 is configured to provide light 46 (indicated with two solid arrows) passing through the optics arrangement 40 to illuminate the calibration slide to produce plasmon resonance for generating a color image. The light detector 42 is configured to detect light passing through the calibration slide 10 to acquire image data of the color image as calibration test data for calibration purposes. In other words, in calibration, the calibration slide 10 works in transmission mode for transmitting light to be detected by the light detector 42.

The scanning microscope 36 may be e.g. a brightfield digital pathology scanner, a brightfield and fluorescence digital pathology scanner, or a brightfield, fluorescence, and FISH digital pathology scanner. The scanning microscope is provided to convert glass slides into digital slides, such as e.g. whole slide images of a pathology sample, which can be viewed, managed, and analyzed on a computer monitor.

The metal nanostructures of the calibration slide may also be arranged to produce plasmon resonances that allow absorbing light at an excitation wavelength to produce photo-luminescence and/or fluorescence light for generating a fluorescent image. The fluorescent image comprises a plurality of pixel intensity values that are provided for calibration of a fluorescence microscope.

The plasmon resonances based calibration slide shows a broad absorption and emission spectrum, which may cover all typical fluorescence channels when excited with light at corresponding excitation wavelength. Thus, the same area of the calibration slide may offer photo-luminescence and/or fluorescence output over a large spectral range. In other words, one type of plasmonic structures on the calibration slide may be used to calibrate all fluorescence channels. This may replace the need of multiple fluorescence dyes. Further, due to the nature resonant absorption of the excitation light in the metal nanostructures and re-emission of a fraction of the excitation light at different wavelengths, the photo-luminescence and/or fluorescence of such calibration slide may be less prone to degradation.

Since the calibration slide also produce photo-luminescence and/or fluorescence light under light at an excitation wavelength, the same calibration slide may also offer means for fluorescence calibration. In other words, in a brightfield and fluorescence digital pathology scanner, there is no need to change the calibration slide for brightfield imaging and fluorescence imaging. Thus, the efficiency of calibration may be improved.

Optionally, as shown in FIG. 4, the calibration system 100 is further provided with a calibration device 48. The calibration device 48 comprises a storage unit 50 and a processing unit 52.

The processing unit 52 is configured to compare the acquired calibration test data and the stored predetermined standard calibration data to generate a color correction profile. The color correction profile is used for correcting color and/or resolution of pathological image data of a pathological sample obtained with the scanning microscope.

The color correction profile may be e.g. a color correction matrix. Color correction may be based on e.g. an empirical model.

In an example, the calibration device is integrated with the scanning microscope. In another example, the calibration device is a computer that receives the calibration test data from the scanning microscope.

As a further option, in addition to the pixel layout 14, at least one layout 32, 34 is provided on the surface 18 of the calibration slide 10, which is selected from the group comprising a monolayer of colored microbeads and a resolution and distortion test target (see FIG. 4). The light detector is configured to acquire image data of the at least one layout 32, 34 as further calibration test data. The storage unit 50 is configured to store further predetermined standard calibration data of the at least one layout 32, 34. The processing unit 52 is configured to compare the acquired further calibration test data and the stored further predetermined standard calibration data for calibrating a parameter of the scanning microscope 36. The parameter is selected from the group comprising focus quality of the scanning microscope and resolution and stitching artifacts.

The calibration of the focus quality of the scanning microscope may be based on a measurement of a property of the microbeads images selected from the group comprising intensity, area, density, and distribution. The values of the measured property are then compared to further predetermined standard calibration data, i.e. a known value, for calibrating the scanning microscope.

Thus, the same calibration slide can be used to calibrate color, focus quality, resolution and stitching artifacts. The efficiency of the calibration process can thus be improved.

In an example, the calibration slide 10 is permanently mounted on the scanning microscope 36.

In other words, the calibration slide may be integrated in the scanning microscope 36. This may ensure very high quality in time.

Figure 6:
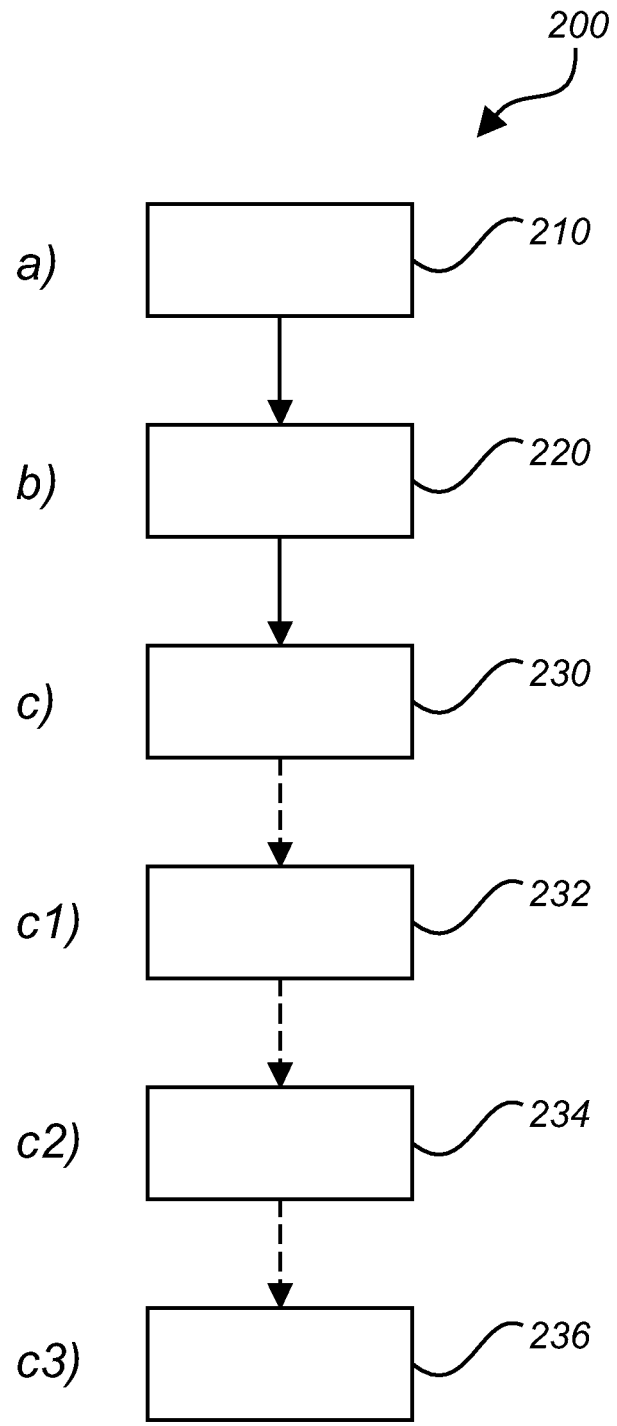
FIG. 6 shows basic steps of an example of a method for calibrating a scanning microscope.

FIG. 6 shows a method 200 for calibrating a scanning microscope comprising a light source and a light detector, which are arranged in an optical path. The method comprises the following steps:

In a first step 210, also referred to as step a), a calibration slide is illuminated with light from the light source towards the light detector. The calibration slide is arranged in the optical path. The calibration slide comprises a substrate and a pixel layout comprising a plurality of spaced apart metal nanostructures arranged on a surface of the substrate, wherein the metal nanostructures are arranged to produce plasmon resonances. The light illuminating the calibration slide produces plasmon resonances for generating a color image comprising a plurality of calibration color values for calibrating a scanning microscope.

In a second step 220, also referred to as step b), light passing through the calibration slide is detected and image data of the color image is acquired as calibration test data;

In a third step 230, also referred to as step c), the calibration test data is used for calibration purposes of the scanning microscope.

In an example, shown as an option in FIG. 5, the method step c), i.e. the method step 230 further comprises the following sub-steps:

In a first sub-step 232, also referred to as sub-step c1), predetermined standard calibration data is provided.

In a second sub-step 234, also referred to as sub-step c2), the obtained calibration test data are compared with the predetermined standard calibration data to generate a color correction profile.

In a third sub-step 236, also referred to as sub-step c3), color and/or resolution of pathological image data of a pathological sample obtained with the scanning microscope are corrected by using the color correction profile.

Figure 7:
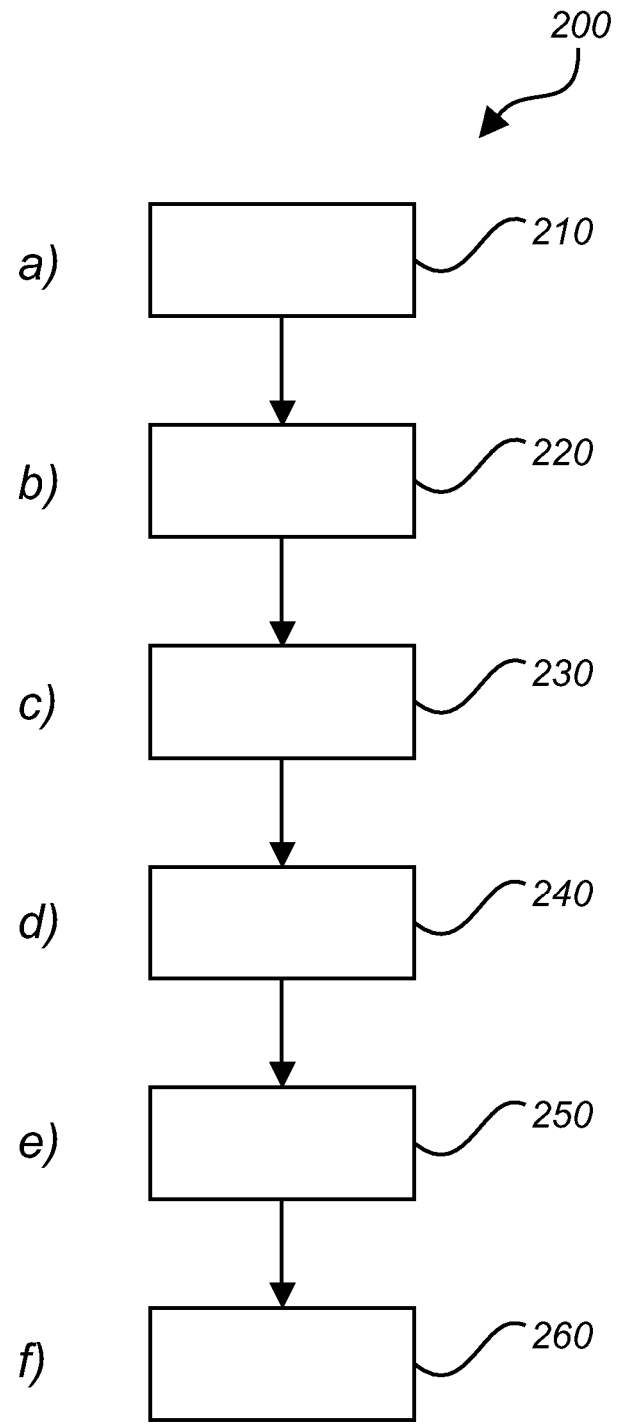
FIG. 7 shows a further example of a method for calibrating a scanning microscope.

For example, in the first step 210, i.e. in step a), an optics arrangement may be provided for directing the light from the light source towards the light detector. The optics arrangement may comprise a first optics sub-arrangement and a second optics sub-arrangement. The first optics sub-arrangement may comprise condense lens, mirrors, etc., which are arranged in the optical path between the light source and the calibration slide for directing and focusing the light on the calibration slide. The second optics sub-arrangement may comprise microscope objective and other imaging optics, which are arranged in the optical path between the calibration slide and the light detector for directing the light toward the light detector, FIG. 7 shows a further option (indicated with dashed arrows), in which in addition to the pixel layout, at least one layout is provided on the surface of the calibration slide, which is selected from the group comprising a monolayer of colored microbeads and a resolution and distortion test target. The method may further comprise the following steps:

In a fourth step 240, also referred to as step d), image data of the at least one layout is acquired as further calibration test data.

In a fifth step 250, also referred to as step e), further predetermined standard calibration data of the at least one layout are provided.

In a sixth step 260, also referred to as step f), the acquired further calibration test data and the stored further predetermined standard calibration data are compared for calibrating a parameter of the scanning microscope, wherein the parameter is selected from the group comprising focus quality of the scanning microscope; and resolution and stitching artifacts.

Figure 8:
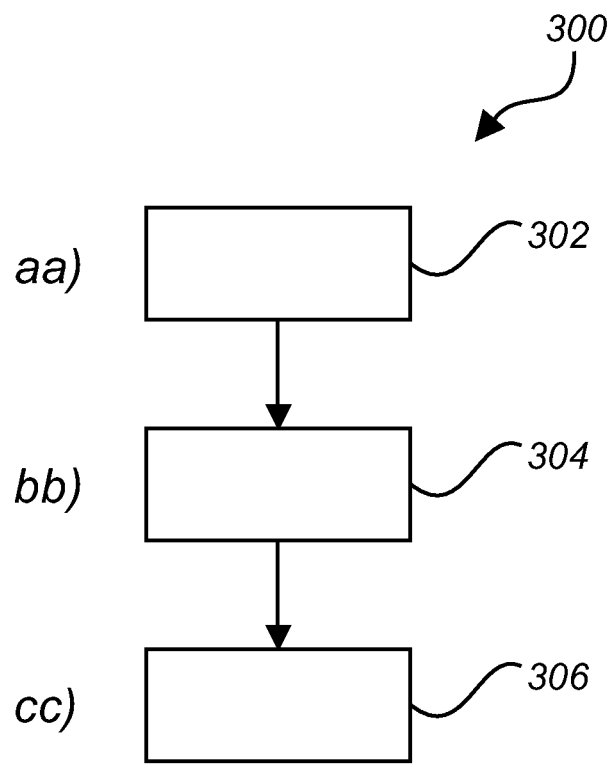
FIG. 8 shows basic steps of an example of a method for manufacturing a calibration slide with a plurality of layouts.

FIG. 8 shows a method 300 of manufacturing a calibration slide with a plurality of layouts comprising a pixel layout with a plurality of spaced apart metal nanostructures arranged on a surface of the substrate, a monolayer of colored microbeads, and a resolution and distortion test target, the method comprises the following steps:

aa) depositing 302 a monolayer of colored microbeads on a substrate forming a microscope slide;

bb) depositing 304 a pixel layout and a resolution and distortion test target on two different substrates forming two cover slips; and cc) assembling 306 two cover slips on the microscope slide to form a calibration slide.

The metal nanostructures may be prepared using nanoimprint lithography and dry etching. For example, substrate conformal imprint lithography (SCIL) may be used to define an etch mask (e.g. silica based sol-gel) on a continuous aluminium layer, after which this patter is transferred into the aluminium using an anisotropic reactive ion etch based on chlorine chemistry.

The resolution and distortion target may be manufactured via an optical lithography process.

For manufacturing the monolayer of colored microbeads, a specifically chemical process is normally required with printing/spotting steps of the beads on the surface and subsequently washing out the beads excess.

However, making the microbeads monolayer on the same slide after SCIL or optical lithography is impossible because SCIL destroys chemical surface modification. Making SCIL after microbeads is also impossible, since the UV step destroys the microbead bonding to the surface and the surface modification makes aluminium deposition impossible. Optical lithography after SCIL is also impossible, since SCIL etching destroys features made with optical lithography.

Although every target (pixel layout, colored microbeads, and resolution and distortion test target) is created via a very different process and these processes are not compatible with each other, these targets can still be able to be combined in a single calibration slide by manufacturing them on different substrates. It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfil the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. A calibration slide for a digital pathology scanning microscope, comprising:
a substrate; and
a pixel layout comprising a plurality of spaced apart metal nanostructures arranged on a surface of the substrate;
wherein the substrate is optically transparent;
wherein the metal nanostructures are arranged to produce plasmon resonances for generating a color image under a bright-field illumination; and
wherein the color image comprises a plurality of calibration color values that are provided for calibrating a digital pathology scanning microscope.

2. The calibration slide claim 1, wherein the metal nanostructures are arranged to couple to each other to tune a resonance wavelength such that the plurality of calibration color values of the generated color image is adaptable to target colors of a selected color calibration method.

3. The calibration slide of claim 1, wherein the pixel layout comprises at least two pixel sub-layouts, wherein the at least two pixel sub-layouts are configured to generate different colors.

4. The calibration slide of claim 1, wherein the metal nanostructures comprises a metal selected from the group comprising gold, silver, copper, aluminium, and aluminium alloy.

5. The calibration slide of claim 1, wherein each metal nanostructure has a cross-sectional dimension in a range of 30 nm to 700 nm or 60 nm to 450 nm;
wherein each metal nanostructure has a thickness in a range of 10 nm to 1 µm, preferably 25 nm to 150 nm; or
wherein a distance between adjacent metal nanostructures is comparable to a visible light wavelength, which is in a range of 100 nm to 1 µm or 180 nm to 650 nm.

6. The calibration slide of claim 1, wherein in addition to the pixel layout, at least one layout is provided on the surface of the calibration slide, which is selected from the group comprising:
a monolayer of colored microbeads; and
a resolution and distortion test target.

7. The calibration slide of claim 1, wherein the metal nanostructures are arranged to produce plasmon resonances that allow absorbing light at an excitation wavelength to produce one or a combination of photo-luminescence or fluorescence light for generating a fluorescent image; and wherein the fluorescent image comprises a plurality of pixel intensity values that are provided for calibration of a fluorescence microscope.

8. A calibration system, comprising:
a scanning microscope; and
a calibration slide, comprising:
   a substrate; and
   a pixel layout comprising a plurality of spaced apart metal nanostructures arranged on a surface of the substrate;
   wherein the substrate is optically transparent;
   wherein the metal nanostructures are arranged to produce plasmon resonances for generating a color image under a bright-field illumination; and
   wherein the color image comprises a plurality of calibration color values that are provided for calibrating a digital pathology scanning microscope;
wherein the scanning microscope comprises:
a light source; and
a light detector;
wherein the light source and the light detector are arranged in an optical path;
wherein in calibration, the calibration slide is arranged in the optical path between the light source and the light detector;
wherein the light source is configured to provide light illuminating the calibration slide to produce plasmon resonances for generating a color image; and
wherein the light detector is configured to detect light passing through the calibration slide to acquire the image data of the color image as calibration test data for calibration purposes.

9. The system of claim 8, wherein the calibration system is further provided with a calibration device comprising:
a storage unit; and
a processing unit;
wherein the storage unit is configured to store predetermined standard calibration data;
wherein the processing unit is configured to compare the acquired calibration test data and the stored predetermined standard calibration data to generate a color correction profile; and
wherein the color correction profile is used for correcting one or a combination of color or resolution of pathological image data of a pathological sample obtained with the scanning microscope.

10. The system of claim 8, wherein in addition to the pixel layout, at least one layout is provided on the surface of the calibration slide, which is selected from the group comprising a monolayer of colored microbeads and a resolution and distortion test target;
   wherein the light detector is configured to acquire image data of the at least one layout as further calibration test data;
   wherein the storage unit is configured to store further predetermined standard calibration data of the at least one layout;
   wherein the processing unit is configured to compare the acquired further calibration test data and the stored further predetermined standard calibration data for calibrating a parameter of the scanning microscope; and
   wherein the parameter is selected from the group comprising:
   focus quality of the scanning microscope;
   resolution and stitching artifacts.

11. The system of claim 8, wherein the calibration slide is permanently mounted on the scanning microscope.

12. A method for calibrating a scanning microscope comprising a light source and a light detector, which are arranged in an optical path, the method comprising the following steps:
   a) illuminating a calibration slide with light from the light source towards the light detector;
   wherein the calibration slide is arranged in the optical path;
   wherein the calibration slide comprises a substrate and a pixel layout comprising a plurality of spaced apart metal nanostructures arranged on a surface of the substrate, wherein the metal nanostructures are arranged to produce plasmon resonances; and
   wherein the light illuminating the calibration slide produces plasmon resonances for generating a color image comprising a plurality of calibration color values for calibrating a scanning microscope;
   b) detecting light passing through the calibration slide and acquiring image data of the color image as calibration test data; and
   c) using the calibration test data for calibration purposes of the scanning microscope.

13. The method of claim 12, wherein the method step c) further comprises the following sub-steps:
   c1) providing) predetermined standard calibration data;
   c2) comparing the obtained calibration test data with the predetermined standard calibration data to generate a color correction profile; and
   c3) correcting one or a combination of color or resolution of pathological image data of a pathological sample obtained with the scanning microscope by using the color correction profile.

14. The method of claim 12, wherein in addition to the pixel layout, at least one layout is provided on the surface of the calibration slide, which is selected from the group comprising a monolayer of colored microbeads and a resolution and distortion test target; and
   wherein the method further comprises the following steps:
   d) acquiring image data of the at least one layout as further calibration test data;
   e) providing further predetermined standard calibration data of the at least one layout; and
   f) comparing the acquired further calibration test data and the stored further predetermined standard calibration data for calibrating a parameter of the scanning microscope;
   wherein the parameter is selected from the group comprising:
   focus quality of the scanning microscope; and
   resolution and stitching artifacts.

15. A method of manufacturing a calibration slide with a plurality of layouts comprising a pixel layout with a plurality of spaced apart metal nanostructures arranged on a surface of the substrate, a monolayer of colored microbeads, and a resolution and distortion test target, the method comprises the following steps:
   aa) depositing a monolayer of colored microbeads on a substrate forming a microscope slide;
   bb) depositing a pixel layout and a resolution and distortion test target on two different substrates forming two cover slips; and
   cc) assembling two cover slips on the microscope slide to form a calibration slide.

* * * * *